(12) United States Patent
Wu et al.

(10) Patent No.: US 10,782,436 B2
(45) Date of Patent: Sep. 22, 2020

(54) GUIDANCE SYSTEM FOR RANGING USING UNBALANCED MAGNETIC FIELDS

(71) Applicant: Halliburton Energy Services, Inc., Houston, TX (US)

(72) Inventors: Hsu-Hsiang Wu, Sugar Land, TX (US); Joseph D. Burke, Spring, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 353 days.

(21) Appl. No.: 15/525,317

(22) PCT Filed: Dec. 31, 2014

(86) PCT No.: PCT/US2014/072954
§ 371 (c)(1),
(2) Date: May 9, 2017

(87) PCT Pub. No.: WO2016/108875
PCT Pub. Date: Jul. 7, 2016

(65) Prior Publication Data
US 2017/0329035 A1 Nov. 16, 2017

(51) Int. Cl.
*G01V 3/26* (2006.01)
*E21B 47/022* (2012.01)
(Continued)

(52) U.S. Cl.
CPC .......... *G01V 3/26* (2013.01); *E21B 47/02216* (2013.01); *E21B 7/04* (2013.01); *E21B 43/2406* (2013.01)

(58) Field of Classification Search
CPC ....... G01V 3/26; E21B 47/02216; E21B 7/04; E21B 43/2406; E21B 47/022
See application file for complete search history.

(56) References Cited

U.S. PATENT DOCUMENTS 4,372,398 A * 2/1983 Kuckes .................. E21B 47/02
166/66.5
4,791,373 A 12/1988 Kuckes
(Continued)

FOREIGN PATENT DOCUMENTS

| RU | 2386810 C2 | 4/2010 |
|---|---|---|
| WO | 2012067611 A1 | 5/2012 |
| WO | 2014089505 A1 | 6/2014 |

OTHER PUBLICATIONS

Australian Application Serial No. 2014415627 Notice of Acceptance dated Jul. 3, 2018, 3 pages.
(Continued)

*Primary Examiner* — Son T Le
(74) *Attorney, Agent, or Firm* — Gilliam IP PLLC (57) ABSTRACT

A system for ranging between a target well and a ranging well using unbalanced magnetic fields. The system comprises a current injection path associated with a target well casing. The current injection path is configured to generate a first magnetic field. A return path is coupled to the current injection path. The return path is configured to generate a second magnetic field such that the first and second magnetic fields are unbalanced with respect to each other. The unbalanced magnetic fields can be measured and used to range with the target well.

22 Claims, 8 Drawing Sheets

(51) Int. Cl.
*E21B 7/04* (2006.01)
*E21B 43/24* (2006.01)

(56) References Cited

U.S. PATENT DOCUMENTS

| | | | |
|---|---|---|---|
| 5,218,301 A | 6/1993 | Kuckes | |
| 5,343,152 A | 8/1994 | Kuckes | |
| 5,485,089 A * | 1/1996 | Kuckes | E21B 47/02216 |
| | | | 175/45 |
| 5,657,826 A | 8/1997 | Kuckes | |
| 2005/0285754 A1* | 12/2005 | Hall | E21B 17/028 |
| | | | 340/855.1 |
| 2007/0278008 A1 | 12/2007 | Kuckes et al. | |
| 2008/0041626 A1 | 2/2008 | Clark | |
| 2009/0030615 A1* | 1/2009 | Clark | E21B 47/02216 |
| | | | 702/7 |
| 2009/0091328 A1 | 4/2009 | Clark et al. | |
| 2009/0189617 A1* | 7/2009 | Burns | E21B 43/24 |
| | | | 324/649 |
| 2009/0194333 A1 | 8/2009 | MacDonald | |
| 2010/0097066 A1* | 4/2010 | Gao | G01V 3/28 |
| | | | 324/339 |
| 2011/0011580 A1 | 1/2011 | Clark et al. | |
| 2014/0111210 A1 | 4/2014 | Fang et al. | |
| 2015/0219784 A1* | 8/2015 | Hibbs | G01V 3/26 |
| | | | 324/338 |

OTHER PUBLICATIONS

Russian Application Serial No. 2017117062; Notice of Decision to Grant; dated Jul. 2, 2018, 4 pages.
Australia Application Serial No. 2014415627, Examination Report No. 1, dated Nov. 21, 2017, 3 pgs.
IN Application Serial No. 201717013615, Office Action, dated May 28, 2019, 6 pages.
ID Application Serial No. P00201703403; Office Action, dated Jun. 11, 2019, 3 pages.
CA Application Serial No. 2,966,608, Office Action, dated Dec. 3, 2018, 4 pages.
Canadian Application Serial No. 2,966,608; Canadian First Office Action; dated Feb. 27, 2018, 5 pages.
"International Application Serial No. PCT/US2014/072954, International Search Report dated Sep. 1, 2015", 3 pgs.
"International Application Serial No. PCT/US2014/072954, Written Opinion dated Sep. 1, 2015", 9 pgs.
Canadian Application Serial No. 2,966,608; Examiner's Letter, Nov. 29, 2019, 6 pages.

* cited by examiner

Fig. 15

GUIDANCE SYSTEM FOR RANGING USING UNBALANCED MAGNETIC FIELDS

BACKGROUND

Magnetic ranging refers to well positioning that provides relative direction and distance of one well with respect to another. Several technologies for ranging from a ranging well to a remote casing in a target well are based upon launching a current at a known frequency from a power supply at the earth's surface down the casing of the target well and receiving a signal radiated from that casing in the ranging well.

The power supply at the surface typically employs a cable coupled to a weight bar (to provide downhole contact to the well casing) to deliver the current downhole so that magnetic fields can be generated surrounding the target well. The downhole contact between the weight bar and the casing results in the current flowing uphole through the casing. Sensors in the ranging well (e.g., drilling well) may measure the magnetic fields so that distance and direction between the target well and ranging well can be determined.

One problem with this method is that the current flowing uphole is in an opposite direction to the cable current direction. The magnetic field generated by each current flow has the effect of reducing the total magnetic field received at the sensors in the ranging well. Thus, it may be difficult to measure the resulting magnetic field in the ranging well.

DETAILED DESCRIPTION

The embodiments described herein operate to provide information that assists in determining relative distance and direction of a well being drilled near at least one other well. For example, determining a location of a target well in relation to a ranging well. The ranging well may also be referred to as the drilling well.

A "target well" may be defined herein as a well, the location of which is to be used as a reference for the construction of another well. The other well may be defined as a "ranging well." Other embodiments may reverse this terminology since the embodiments are not limited to any one well being the target well and any one well being the ranging well. The ranging may be used in steam assisted gravity drainage (SAGD), well intersection, relief well intersection, well avoidance, or any other usage where ranging, maintaining, avoiding, or intersecting between two wells is desirable.

As used herein, unbalanced magnetic fields are defined as two or more magnetic fields that have a different field pattern. For example, the magnetic fields may have different directions and/or different amplitudes.

The present embodiments generate unbalanced magnetic fields so that Eq. (1) below will not be zero or too small to be measureable. One method for generating the unbalanced magnetic fields includes introducing different orientations of cable winding in or around the casing instead of a straight cable along the wellbore, as illustrated in FIGS. 1-4 and discussed subsequently. Another method includes introducing magnetic shielding (e.g., high permeability mu-metal) in the cables, as illustrated in FIGS. 5-9 and discussed subsequently. Other methods may combine the different orientations of cable windings with the magnetic shielding. For example, the high permeability mu-metal may be used in a spiral cable configuration. In another example, any of the cables of FIGS. 5-9 may be used in any of the configurations of FIGS. 1-4.

To represent a magnetic field generated by a cable in a casing, the total current flowing in the cable may be represented by $I_C$. The current flowing in the casing back to ground may be represented by $I_t(\beta)$ having an azimuthal angle $\beta$ with respect to the target well. Consequently, with a separation R between sensors in the ranging well and the casing in the target well, the magnetic field H received at the sensors may be expressed by $$H = \frac{I_c - \sum_{0°}^{360°} I_t(\beta)}{2\pi R} \quad (1)$$

The cable current and the casing current are very similar due to the well-head ground, as described by $$I_c \approx \sum_{0°}^{360°} I_t(\beta) \quad (2)$$

Part of the casing current may disappear or be reduced due to lossy pipe properties and/or the current leaking to geological formations. In such situations, $I_C$ in Eq. (2) is larger than the total casing current in all azimuthal directions. Eq. (2) may then be representative of a very weak or no magnetic field at Eq. (1) such that wireline sensors in the ranging well may not be able to measure the field and determine a distance and/or direction to the target well during a wireline operation.

Figure 1:
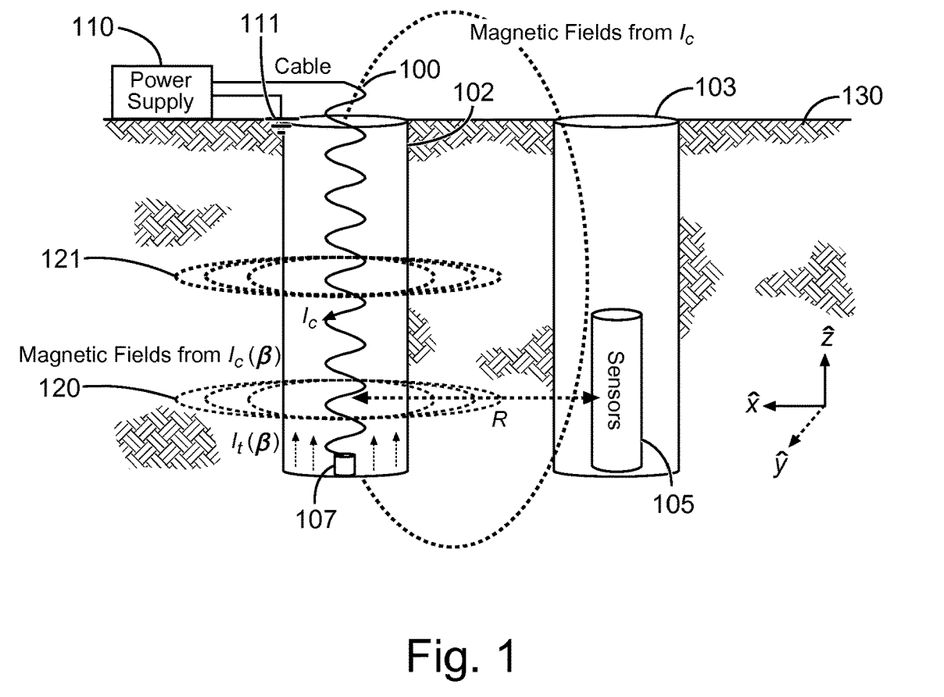
FIG. 1 is a diagram of an example single wire guidance system incorporating a spiral configuration, according to aspects of the present disclosure.

FIG. 1 is a diagram of an example single wire guidance system incorporating a spiral configuration, according to aspects of the present disclosure This embodiment may use a typical cable 100 configured in a spiral and/or one of the subsequently discussed magnetically shielded cables, for example using high permeability mu-metals.

FIG. 1 shows a cable 100 spirally wound within a casing 102 of a target well. The spiral cable 100 (e.g., solenoid cable) is terminated downhole at the bottom of the casing 102 by a termination 107. The termination 107 may be a weight bar that is in electrical contact with the casing 102 or some other electrically conductive termination between the cable 100 and the casing 102.

The cable 100 is coupled to a power supply 110 on the surface of a formation 130 through which the target well and a ranging well 103 are drilled. The power supply 110 provides the current $I_C$ through the cable 100. The power supply ground 111 may be grounded to a well head, which is electrically connected to the casing, or to the geological formation 130. The termination 107 between the spiral cable 100 and the casing 102 results in casing current $I_t(\beta)$ that returns to the power supply ground 111.

The ranging well 103 may include sensors 105 (e.g., sensors included in a wireline logging tool or included in a drill string, e.g. as part of a bottom hole assembly (BHA)) to measure the magnetic field produced at the target well. The sensors 105 may include triaxial magnetometers or gradient sensors. The sensors 105 are located a distance R (see Eq. (1)) from the target well spiral cable 100.

The spiral cable configuration 100 produces magnetic fields 121 in different directions as compared to the magnetic fields 120 from the casing current. FIG. 1 defines that the z-direction is along the wellbore and the x-direction is in the direction from the drilling well to the target well. The magnetic fields 120 at the sensors with respect to the casing current $I_t(\beta)$ will be in the y-direction, whereas the magnetic fields 121 from spiral cabling 100 will be in both the y and z-directions.

The y-directional field from the spiral cabling 100 is typically similar but opposite in sign to the y-directional field 120 from casing current $I_t(\beta)$. Therefore, the total magnetic y-directional fields at the sensors 105 will disappear in Eq. (1). On the other hand, the more turns the spiral cabling 100 has, the more unbalanced the y-directional and z-directional fields will be. In one or more embodiments, such as when spiral cabling 100 that has many turns and/or a relatively large radius for each turn, Eq. (1) will not be valid. Thus it is possible to acquire a significant total field (both y-directional and z-directional fields) downhole from the cable current $I_C$ in FIG. 1 and such total field can be detected by different sensor configurations 105 in the ranging well 130.

Figure 2:
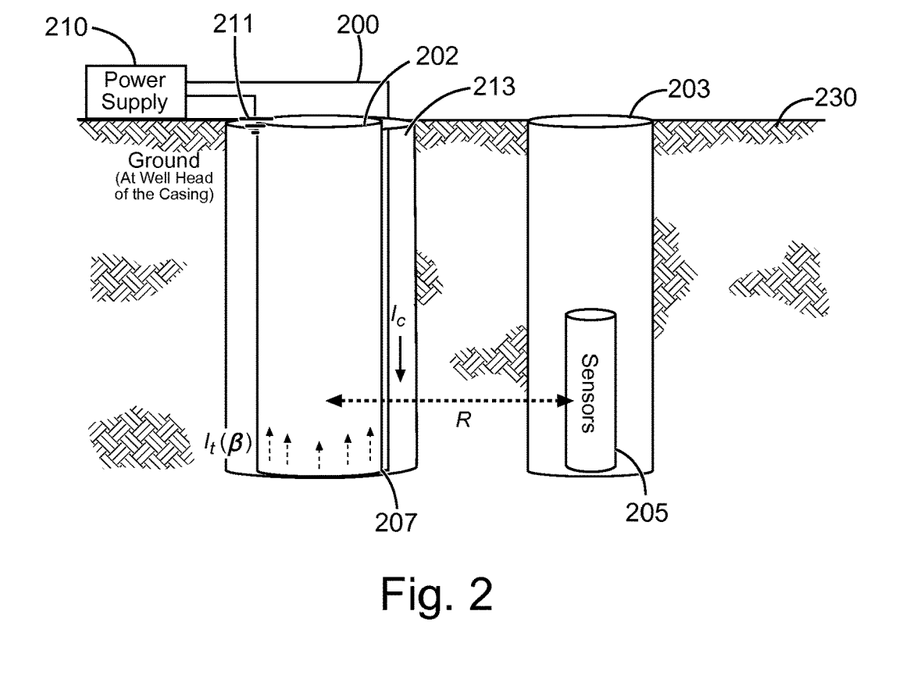
FIG. 2 is a diagram of an example single wire guidance system incorporating the cable terminated downhole on the outside of a target well casing, according to aspects of the present disclosure.

FIG. 2 is a diagram of an example single wire guidance system incorporating the cable terminated downhole on the outside of a target well casing, according to aspects of the present disclosure. The cable 200 may include a straight cable (i.e., non-spiral) or one of the cable embodiments of FIGS. 5-9.

FIG. 2 illustrates the casing 202 surrounded by an insulating concrete layer 213. The cable 200 is embedded in the insulating concrete layer 213 and coupled to the casing at a cable termination point 207. The termination point 207 may be any location along the target well casing 202 according to various embodiments.

The cable 200 is further coupled to a power supply 210 on the surface of the formation 230 through which the wells are drilled. The power supply 210 provides the current $I_C$ through the cable 200. The power supply ground 211 may be grounded to a well head, which is electrically connected to the casing, or to the geological formation 230.

The power supply 210 supplies the current $I_C$ through the cable 200 to the termination point 207. The current then returns to ground on the casing as represented by return current $I_t(\beta)$.

The ranging well 203 includes sensors 205 (e.g., magnetometers, gradient sensors) that are located a distance R from the center of the target well casing 202. The sensors 205 may be included in a wireline logging tool or included in a drill string, e.g. part of a BHA.

Using one of the cables of FIGS. 5-9, current may be delivered to the end of the target well to generate larger unbalanced total fields as compared to the fields due to the same current of the typical straight cable. The resulting magnetic fields are received at the sensors 205 in ranging well owing to the advantages of unbalance magnetic fields between current $I_C$ at the cable 200 and the current $I_t(\beta)$ at the casing 202.

Figure 3:
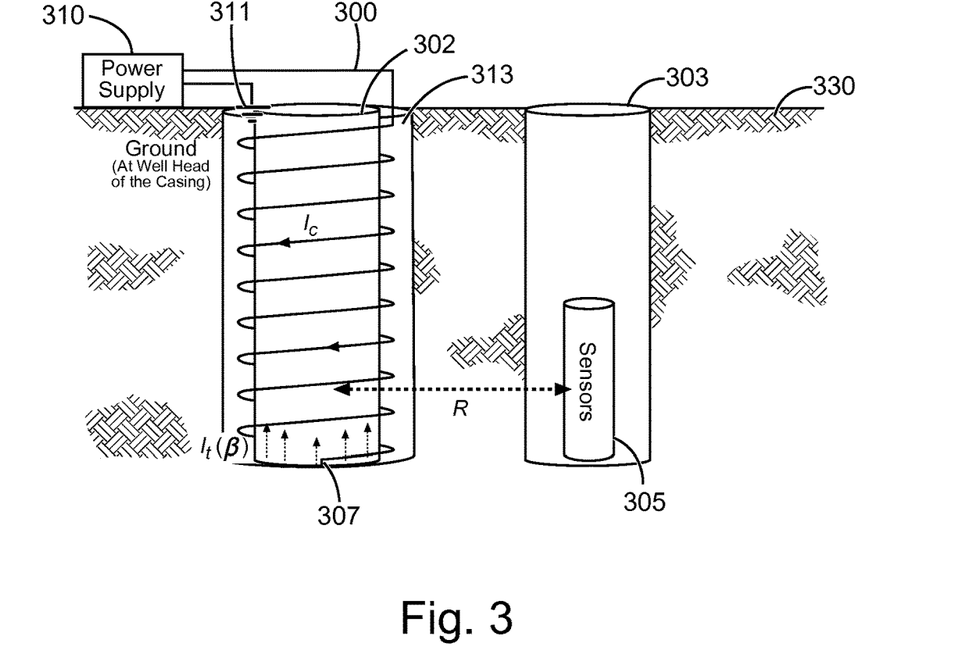
FIG. 3 is a diagram of an example single wire guidance system incorporating the spiral configuration on the outside of the target well casing, according to aspects of the present disclosure.

FIG. 3 is a diagram of an example single wire guidance system incorporating the spiral configuration on the outside of the target well casing, according to aspects of the present disclosure. This embodiment adopts similar wiring methods as illustrated in FIGS. 5-9 as cable winding methods integrated with the insulating cement layer 313.

One end of the spirally wound cable 300 is coupled to a power supply 310 on the surface. The target well and the ranging well 303 are drilled into a geological formation 330. The power supply 310 is further grounded to either the well head of the target well or the geological formation 330. The power supply 310 supplies the cable current $I_C$.

The spiral cable 300 is terminated on the casing 302 at a termination point 307. The termination point 307 is shown at the bottom of the casing 302 but may be located anywhere on the casing 302. The connection of the cable 300 to the casing 302 enables the casing current $I_t(\beta)$ to return to the power supply ground.

The cable 300 of FIG. 3 may be a typical cable (with conductor and insulator inside) or a magnetically shielded cable. The cement layer 313 provides both insulation of the cable 300 from the casing 302 as well as stabilization of the cable 300 with respect to the casing 302. The system of FIG. 3 provides the unbalanced magnetic fields as described previously. Since the cable 300 is permanently installed with cement 313 around the casing 302, the cable may be accessible anytime and can be used for other purposes. For example, the cable 300 may be built with fibers for well monitoring purposes.

Figure 4:
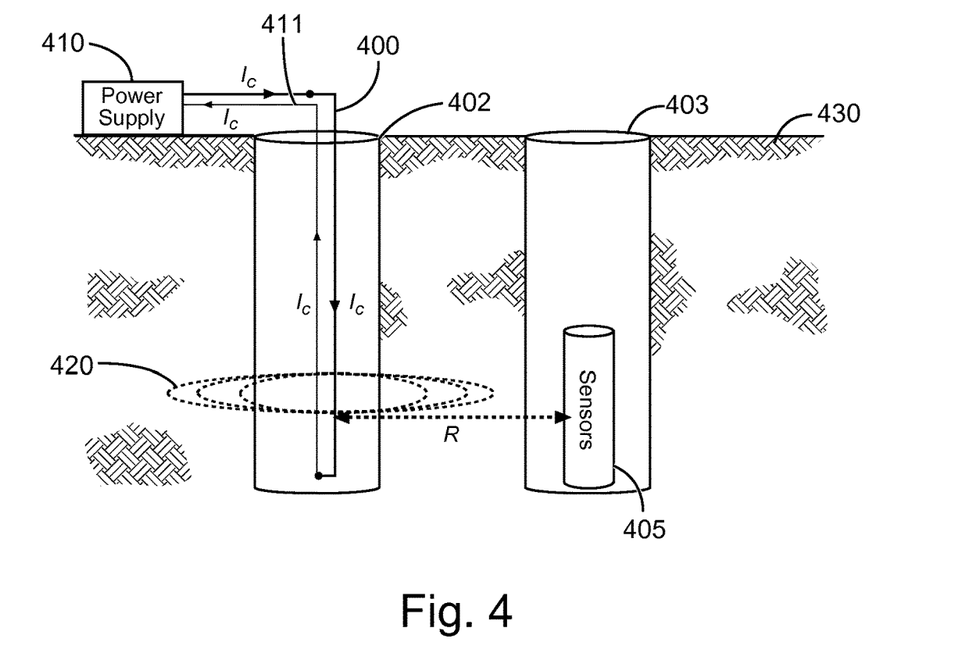
FIG. 4 is a diagram of an example two cable system, according to aspects of the present disclosure.

FIG. 4 is a diagram of an example two cable system, according to aspects of the present disclosure. Both the current source cable 400 and the current return cable 411 are located within the target well casing 402.

The system of FIG. 4 includes the current source cable 400 coupled to an output of a power supply 410. The current return cable 411 is coupled to the power supply's return.

As in previous embodiments, the target well casing 402 and the ranging well 403 are located in a geological formation 430. The ranging well 403 includes sensors 405 located a distance R from the center of the target well casing 402.

A first cable 400 of the two cables is a magnetically shielded cable such as those shown in FIGS. 5-9. The second cable 411 of the two cables is normal, unshielded cable. The cables 400, 411 have no connection to the target well casing 402 so that no casing current will be generated. The sensors 405 in the ranging well 403 measure the unbalanced magnetic fields 420 where a majority of the magnetic fields are generated from the normal, unshielded cable. Either one of the current source cable 400 or the current return cable 411 may be the magnetically shielded cable as long as the other cable is the unshielded cable.

FIGS. 5-9 illustrate various embodiments for magnetically shielded cables. These embodiments may utilize a cable with: (a) intrinsic magnetic shielding materials, (b) intrinsic solenoid wiring or extrinsic spiral winding around a cylindrical material (such as mu-metal), or (c) other intrinsic or extrinsic wiring orientations (e.g., cylindrical, triangular, rectangular, or other shapes for wiring). A mu-metal may be defined as a nickel-iron alloy.

Figure 5:
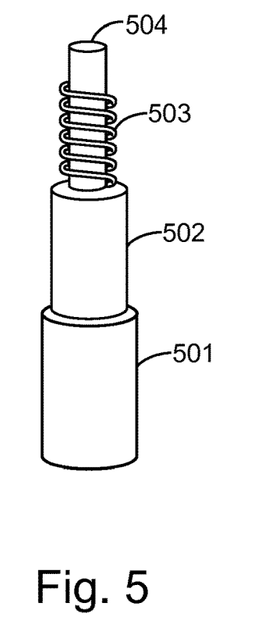
FIG. 5 is a diagram of an example shielded cable with a metal exterior over an insulator, according to aspects of the present disclosure.

FIG. 5 is a diagram of an example shielded cable with a metal exterior over an insulator, according to aspects of the present disclosure. The illustrated embodiment includes a metal enclosure 501 (e.g., steel) to protect the conductor 504 and shielding 503. An insulator 502 insulates the conductor 504 and shielding 503 from the metal enclosure 501. The shield 503 (e.g., metal, mu-metal) is wrapped around the metal conductor 504 (e.g., copper). In an embodiment, the shield 503 is spirally wrapped around the metal conductor 504.

Figure 6:
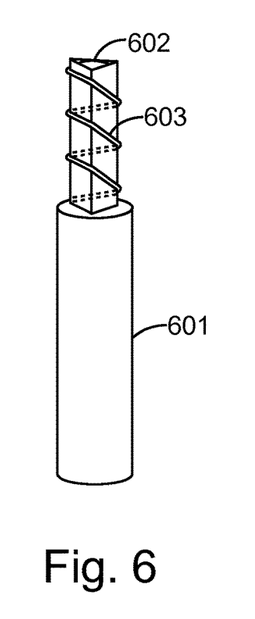
FIG. 6 is a diagram of an example shielded cable with a triangular metal core, according to aspects of the present disclosure.

FIG. 6 is a diagram of an example shielded cable with a triangular metal core, according to aspects of the present disclosure. The illustrated embodiment includes a triangular metal core 602 (e.g., metal, mu-metal) around which is wrapped a metal conductor 603 (e.g., copper) that provides magnetic shielding of the metal core 602. An insulator 601 encloses the cable for protection of the cable as well as insulation of the conductor 602 and shielding 603 from other metal contact. The metal conductor 603 may be spirally wrapped around the metal core 602.

Figure 7:
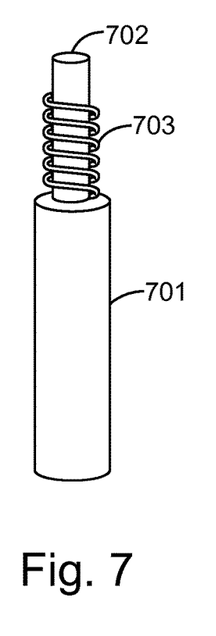
FIG. 7 is a diagram of an example shielded cable with an insulator exterior, according to aspects of the present disclosure.

FIG. 7 is a diagram of an example shielded cable with an insulator exterior, according to aspects of the present disclosure. The illustrated embodiment includes a cylindrical metal core 702 (e.g., metal, mu-metal) around which is wrapped a metal conductor 703 (e.g., copper) that provides magnetic shielding of the metal core 702. An insulator 701 encloses the cable for protection of the cable as well as insulation of the metal conductor 702 and shielding 703 from other metal contact. The metal conductor 703 may be spirally wrapped around the metal core 702.

Figure 8:
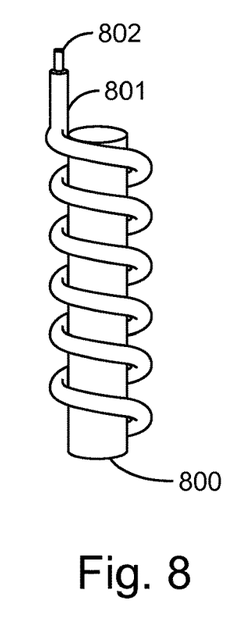
FIG. 8 is a diagram of an example shielded cable with a cylindrical conductive material wrapped with an insulated wire, according to aspects of the present disclosure.

FIG. 8 is a diagram of an example shielded cable with a cylindrical conductive material wrapped with an insulated wire, according to aspects of the present disclosure. The illustrated embodiment includes a metal core 802 (e.g., copper) enclosed by an insulator 801 to form an insulated wire. The insulated wire is spirally-wrapped around a cylindrical conductive material 800 (e.g., metal, mu-metal) to form the cable. The insulated wire may be spirally wrapped around the cylindrical conductive material 800.

Figure 9:
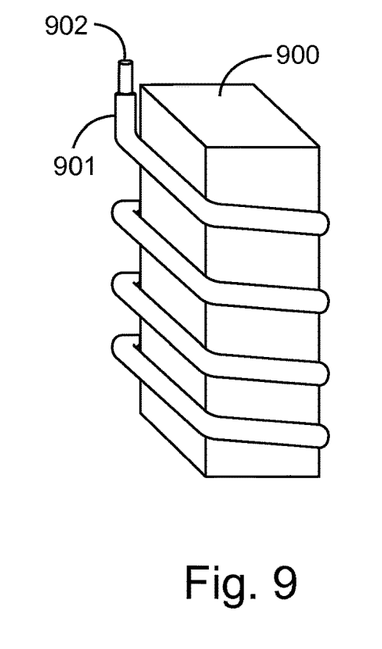
FIG. 9 is a diagram of an example shielded cable with a rectangular conductive material wrapped by an insulated wire, according to aspects of the present disclosure.

FIG. 9 is a diagram of an example shielded cable with a rectangular conductive material wrapped by an insulated wire, according to aspects of the present disclosure. The illustrated embodiment includes a metal core 902 (e.g., copper) enclosed by an insulator 901 to form an insulated wire. The insulated wire is wrapped around a rectangular conductive material 900 (e.g., metal, mu-metal) to form the cable. The insulated wire may be spirally wrapped around the rectangular conductive material 900.

The various shapes and compositions of the embodiments illustrated by FIGS. 5-9 are for purposes of illustration only. Other shapes and compositions may be used for magnetically shielded cables.

Figure 10:
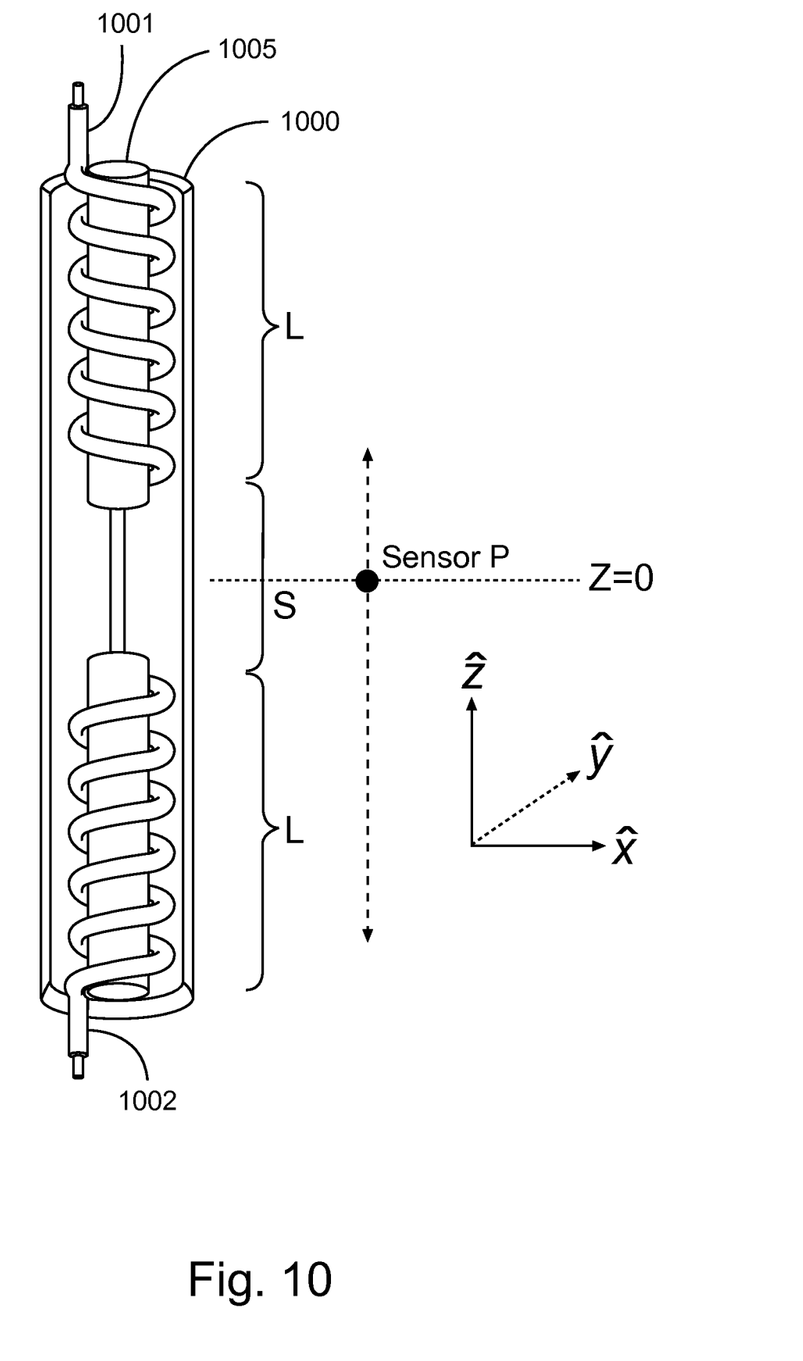
FIG. 10 is a diagram of an example shielded cable apparatus for implementing a method for ranging, according to aspects of the present disclosure.

FIG. 10 is a diagram of an example shielded cable apparatus for implementing a method for ranging, according to aspects of the present disclosure. Parameters from this apparatus, as modeled using the following parameter assumptions, are incorporated into Eq. (1) in order to generate the plots of FIGS. 11 and 12.

FIG. 10 shows that the cable 1000 has two sections 1001, 1002 with spiral wiring. Each section 1001, 1002 is assumed to have a length of L. In addition, there is a separation distance of S between the two spiral wiring sections 1001, 1002.

One spiral wiring 1001 is in a counterclockwise direction and the other spiral wiring 1002 is in clockwise direction. The inner conductor 1005 may be used as a current inject path and the outer conductor 1001, 1002 may be used as a current return path. Which conductor is the current return path and which conductor is the current injection path is interchangeable. An injection path can be a return path by changing the current direction (i.e., applying positive voltage to one path and negative voltage to the other path).

Figure 11:
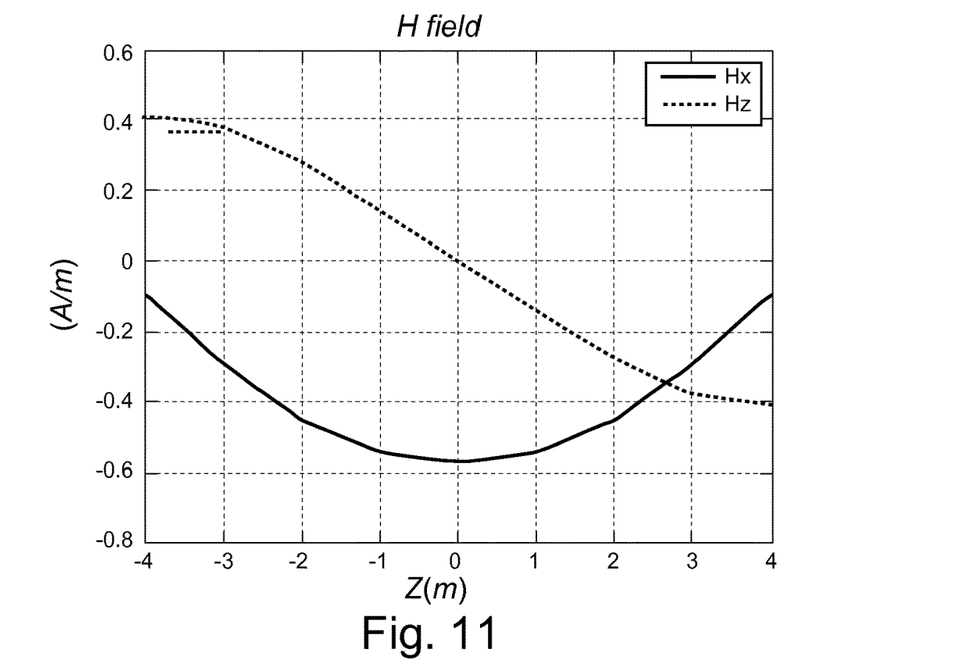
FIG. 11 is a plot showing the unbalanced magnetic field densities in the x-direction and the z-direction in accordance with the shielded cable apparatus of FIG. 10.
Figure 12:
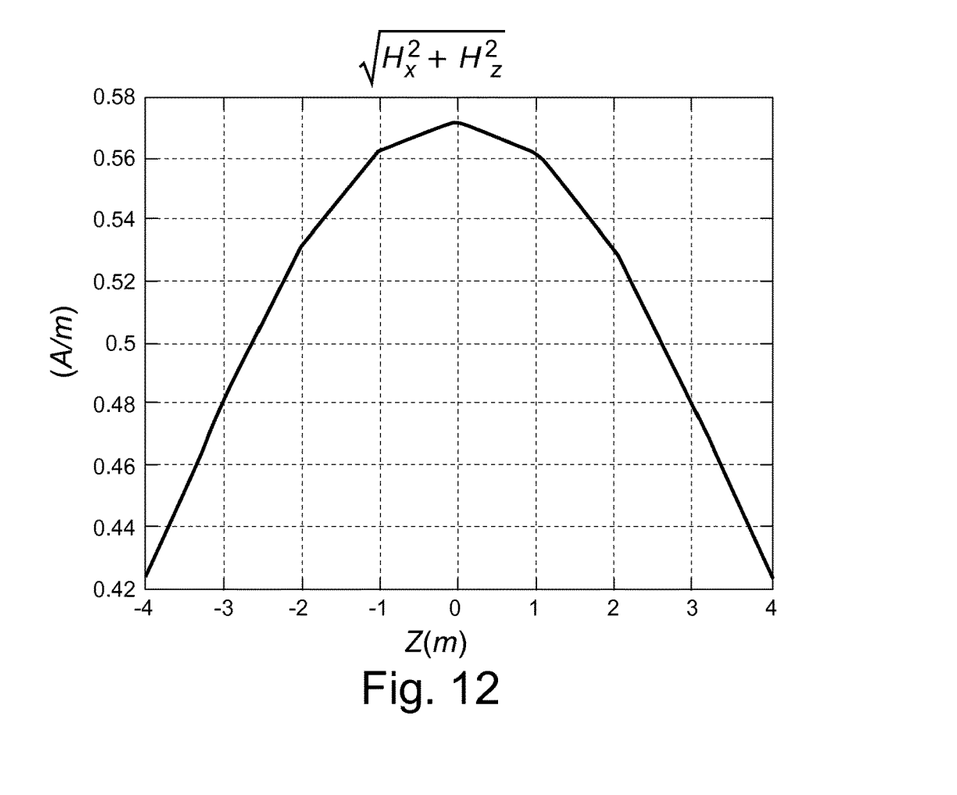
FIG. 12 is a plot showing the total magnetic field density at sensor point P in accordance with the shielded cable apparatus of FIG. 10.

The following parameter assumptions are used for modeling the apparatus of FIG. 10 only to generate the plots of FIGS. 11 and 12 and are not limiting on any other examples herein: radius of the spiral cable=2.54 centimeters, L=4 meters, S=L, the injected current is 1 Amp, and the density of the spiral cable is D=N/L=200=number of turns/meter. The sensor (e.g., magnetometer, wireline tool) is assumed to be 5 meters away in the x direction from the cable. Z=0 meter for point P that represents the position of the sensor between the two spiral wiring sections 1001, 1002.

FIG. 11 is a plot showing the unbalanced magnetic field densities in the x-direction and the z-direction in accordance with the shielded cable apparatus of FIG. 10. FIG. 12 is a plot showing the total magnetic field density at sensor point P in accordance with the shielded cable apparatus of FIG. 10. Both show Amps/meter (A/m) for the magnetic field in the z-direction. It can be seen that the maximum field is approximately 0.57 A/m (or ~716 nT) for the illustrated embodiment. This is a relatively significant magnetic field for a typical ranging application.

The embodiments of FIGS. 10, 11, and 12 are only for purposes of illustration of a typical ranging embodiment. Other embodiments may have different parameters that generate different magnetic fields at the sensor location P.

Figure 13:
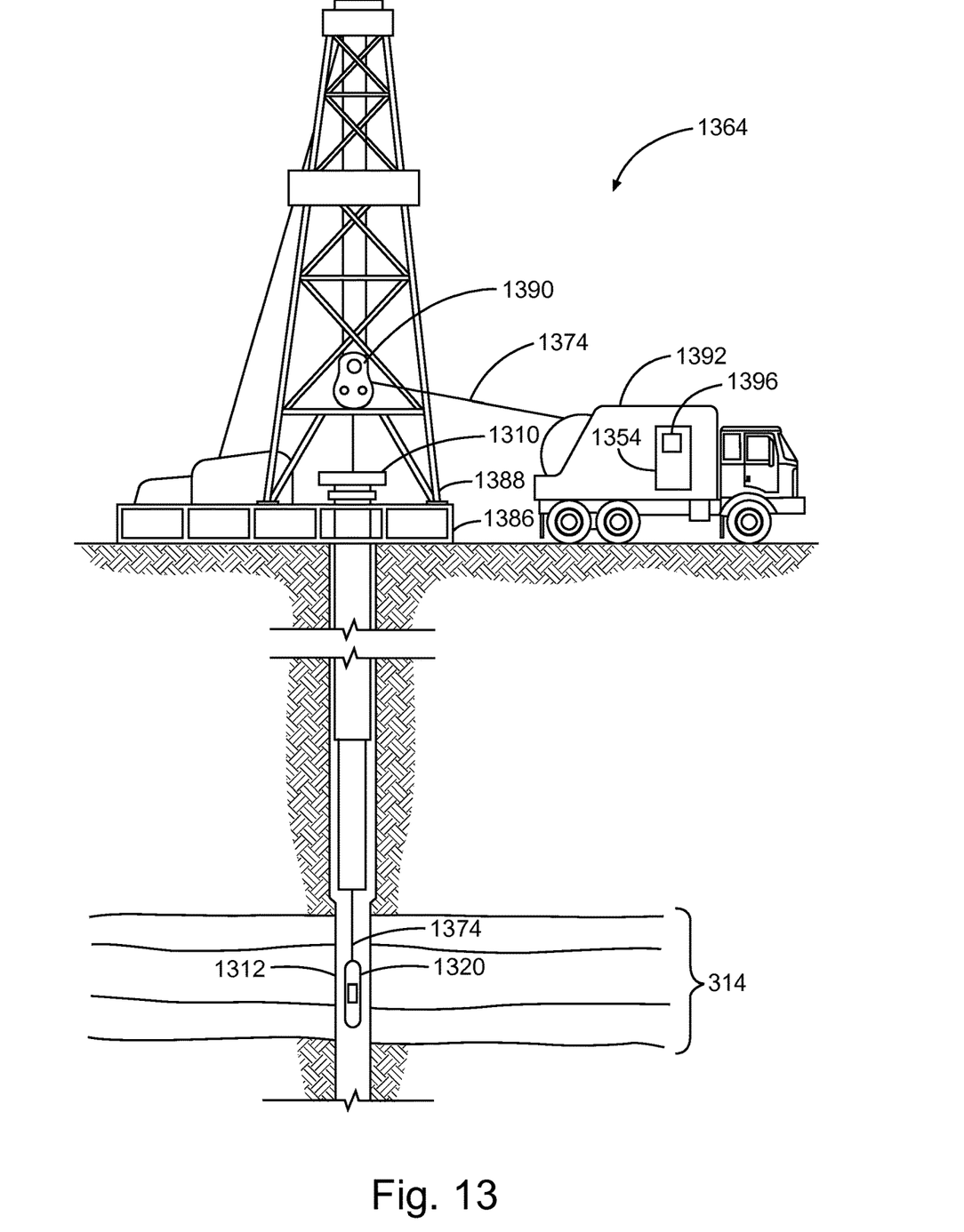
FIG. 13 is a diagram of an example wireline system embodiment, according to aspects of the present disclosure.
Figure 14:
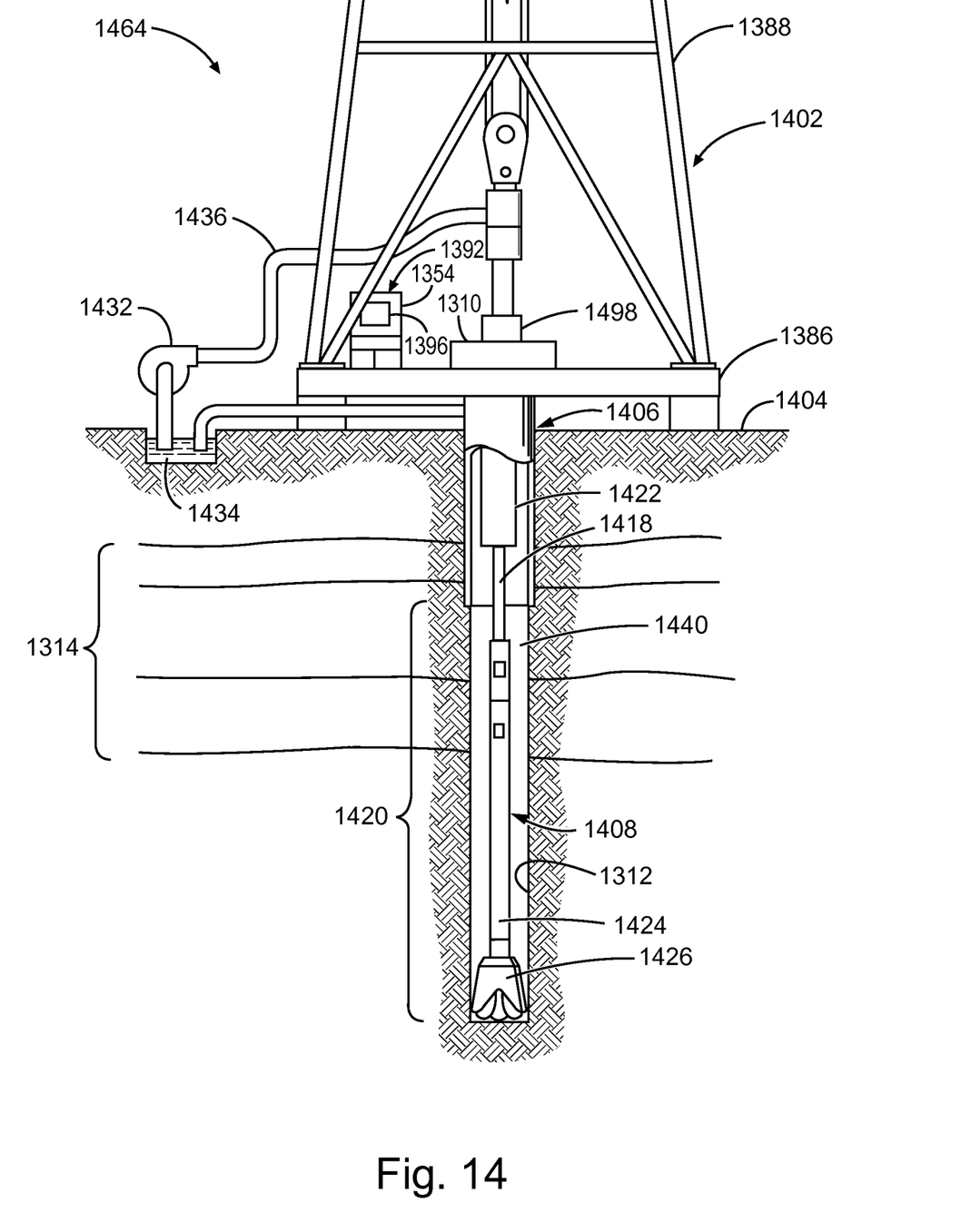
FIG. 14 is a diagram of an example drilling rig system embodiment, according to aspects of the present disclosure.

FIG. 13 is a diagram showing a wireline system 1364 and FIG. 14 is a diagram showing a drilling rig system 1464. The systems 1364, 1464 may thus comprise portions of a wireline logging tool body 1320, including the above-described sensors, as part of a wireline logging operation or of a down hole tool 1424, including the above-described sensors, as part of a down hole drilling operation.

FIG. 13 illustrates a well that may be used as a ranging well or a target well. In this case, a drilling platform 1386 is equipped with a derrick 1388 that supports a hoist 390. If this well is used as the target well, the sensors in the wireline logging tool 1320 and the illustrated cable may be replaced with one or more of the previously discussed embodiments (e.g., spiral cable, intrinsic magnetic shielding materials, intrinsic solenoid wiring or extrinsic spiral winding around a cylindrical material (such as mu-metal), or other intrinsic or extrinsic wiring orientations (e.g., cylindrical, triangular, rectangular, or other shapes for wiring)).

Drilling oil and gas wells is commonly carried out using a string of drill pipes connected together so as to form a drillstring that is lowered through a rotary table 1310 into a wellbore or borehole 1312. Here it is assumed that the drillstring has been temporarily removed from the borehole 1312 to allow a wireline logging tool 1320, such as a probe or sonde, to be lowered by wireline or logging cable 1374 (e.g., slickline cable) into the borehole 1312. Typically, the wireline logging tool 1320 is lowered to the bottom of the region of interest and subsequently pulled upward at a substantially constant speed. In one or more embodiments, the borehole 1312 of FIG. 3 may represent a ranging well to the target well of FIG. 14. When this well is used as a ranging well, the wireline logging tool 1320 may include the sensors to measure the magnetic field produced from the target well.

During the upward trip, at a series of depths, various instruments may be used to perform measurements on the subsurface geological formations 1314 adjacent to the borehole 1312 (and the tool body 1320), including measurements of the magnetic field produced at the target well. The wireline data may be communicated to a surface logging facility 392 for processing, analysis, and/or storage. The logging facility 1392 may be provided with electronic equipment, such as a controller, for various types of signal processing. The controller 1396 may be coupled to the ranging tool and configured to determine and decouple the total magnetic field to a relative range and direction from the ranging well to the target well. Similar formation evaluation data may be gathered and analyzed during drilling operations (e.g., during LWD/MWD operations, and by extension, sampling while drilling).

In some embodiments, the tool body 1320 is suspended in the wellbore by a wireline cable 1374 that connects the tool to a surface control unit (e.g., comprising a workstation 1354). The tool may be deployed in the borehole 1312 on coiled tubing, jointed drill pipe, hard wired drill pipe, or any other suitable deployment technique.

Referring to FIG. 14, it can be seen how a system 1464 may also form a portion of a drilling rig 1402 located at the surface 1404 of a well 1406. The drilling rig 1402 may provide support for a drillstring 1408. The drillstring 1408 may operate to penetrate the rotary table 1310 for drilling the borehole 1312 through the subsurface formations 1314. The drillstring 1408 may include a drill pipe 1418 and a bottom hole assembly 1420, perhaps located at the lower portion of the drill pipe 1418.

The bottom hole assembly 1420 may include drill collars 1422, a down hole tool 1424, and a drill bit 1426. The drill bit 1426 may operate to create the borehole 1312 by penetrating the surface 1404 and the subsurface formations 1314. The down hole tool 1424 may comprise any of a number of different types of tools including sensors used to measure magnetic fields, as described previously, MWD tools, LWD tools, and others. The sensors may be used to measure the magnetic fields and relay the information to a controller 1396 that may then control the direction and depth of the drilling operation in order to range to the target well.

During drilling operations, the drillstring 1408 (perhaps including the drill pipe 1418 and the bottom hole assembly 1420) may be rotated by the rotary table 1310. Although not shown, in addition to, or alternatively, the bottom hole assembly 1420 may also be rotated by a motor (e.g., a mud motor) that is located down hole. The drill collars 1422 may be used to add weight to the drill bit 1426. The drill collars 1422 may also operate to stiffen the bottom hole assembly 1420, allowing the bottom hole assembly 1420 to transfer the added weight to the drill bit 1426, and in turn, to assist the drill bit 1426 in penetrating the surface 1404 and subsurface formations 1314.

During drilling operations, a mud pump 1432 may pump drilling fluid (sometimes known by those of ordinary skill in the art as "drilling mud") from a mud pit 1434 through a hose 1436 into the drill pipe 1418 and down to the drill bit 1426. The drilling fluid can flow out from the drill bit 1426 and be returned to the surface 1404 through an annular area 440 between the drill pipe 1418 and the sides of the borehole 1312. The drilling fluid may then be returned to the mud pit 1434, where such fluid is filtered. In some embodiments, the drilling fluid can be used to cool the drill bit 1426, as well as to provide lubrication for the drill bit 1426 during drilling operations. Additionally, the drilling fluid may be used to remove subsurface formation cuttings created by operating the drill bit 1426.

The workstation 1354 and the controller 1396 may include modules comprising hardware circuitry, a processor, and/or memory circuits that may store software program modules and objects, and/or firmware, and combinations thereof. The workstation 1354 and controller 1396 may be configured to control the direction and depth of the drilling, by executing instructions, in order to perform ranging from a target well using the method for ranging using unbalanced magnetic fields as described subsequently. For example, the controller 1396 may be configured to determine and decouple the total magnetic field to a relative range and direction from the ranging well to the target well. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

Figure 15:
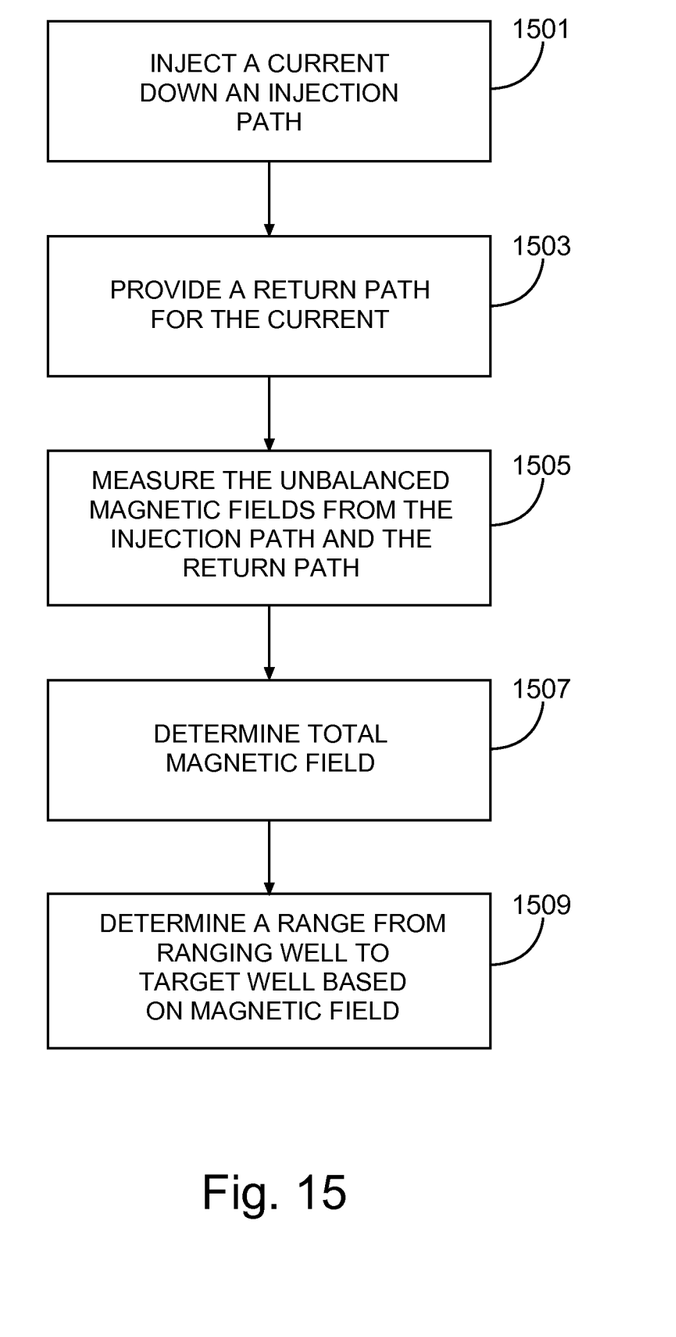
FIG. 15 is a flowchart illustrating an example method for ranging between a target well and a ranging well using unbalanced magnetic fields, according to aspects of the present disclosure.

FIG. 15 is a flowchart showing an embodiment of a method for ranging between a target well and a ranging well using unbalanced magnetic fields. In block 1501, a current is injected, by a power supply, downhole through an injection path (e.g., spiral cable). The current may be a direct current or some form of alternating current (e.g., clock signal, sine wave).

In block 1503, a return path is provided for the current. The return path may be the target well casing or another cable. The return path is coupled to the ground of the power supply.

In block 1505, the unbalanced magnetic fields from the injection path and the return path are measured. The measurement may be accomplished from the ranging well during a wireline operation as shown in FIG. 13 or a MWD/LWD operation as shown in FIG. 14 and discussed previously.

In block 1507, the total magnetic field is measured. The total magnetic field is received at the sensors with the presence of current in the injection path and the return path. Since the first and the second magnetic fields are unbalanced, the sensors pick up a total magnetic field strong enough to determine the relative distance and direction between the target well and the drilling well.

In block 1509, a relative distance and direction of the ranging well to the target well is determined based on the total magnetic field. The range from the well can then be used to steer the ranging well during the drilling operation. When the magnetic field increases, the ranging well is getting closer to the target well. When the magnetic field decreases, the ranging well is getting farther from the target well. In addition, design of gradient sensors with tri-axial component measurements can be utilized to directly determine the relative distance.

Example 1 is a method for ranging between a target well and a ranging well, the method comprising: generating a downhole current through a current injection path, wherein the current injection path generates a first magnetic field; receiving a return current through a return path, wherein the return path generates a second magnetic field, wherein the first and second magnetic fields are unbalanced with respect to each other; and measuring the first and second magnetic fields.

In Example 2, the subject matter of Example 1 can further include measuring the total magnetic fields from the first and second magnetic fields.

In Example 3, the subject matter of Examples 1-2 can further include decoupling the total magnetic field to a relative distance and direction from the ranging well to the target well.

In Example 4, the subject matter of Examples 1-3 can further include the injection path and the return path are exchangeable.

In Example 5, the subject matter of Examples 1-4 can further include wherein generating the downhole current through the current injection path comprises generating the downhole current through a spiral cable.

In Example 6, the subject matter of Examples 1-5 can further include wherein the spiral cable is coupled to a casing of the target well such that the casing is the return path.

In Example 7, the subject matter of Examples 1-6 can further include wherein the spiral cable is located inside or outside of the casing of the target well.

In Example 8, the subject matter of Examples 1-7 can further include wherein generating the downhole current through the current injection path comprises generating the downhole current through an intrinsically magnetically shielded cable.

Example 9 is a system for ranging between a target well and a ranging well, the system comprising: a current injection path associated with a target well casing, wherein the current injection path is configured to generate a first magnetic field; a return path coupled to the current injection path, wherein the return path is configured to generate a second magnetic field such that the first and second magnetic fields are unbalanced with respect to each other; and the current injection path and current return path are exchangeable.

In Example 10, the subject matter of Example 9 can further include wherein the current injection path or the current return path comprises a spiral cable.

In Example 11, the subject matter of Examples 9-10 can further include, wherein the spiral cable is embedded in concrete around the exterior of the target well casing.

In Example 12, the subject matter of Examples 9-11 can further include, wherein the current injection path or the current return path comprises the target well casing.

In Example 13, the subject matter of Examples 9-12 can further include wherein the spiral cable comprises a high permeability mu-metal cable.

In Example 14, the subject matter of Examples 9-13 can further include wherein the spiral cable comprises a mu-metal wire wrapped around a conductive core.

In Example 15, the subject matter of Examples 9-14 can further include wherein the spiral cable comprises a conductive wire wrapped around a mu-metal core.

In Example 16, the subject matter of Examples 9-15 can further include wherein the spiral cable comprises a core having a shape of one of a triangle, a cylinder, or a rectangle.

In Example 17, the subject matter of Examples 9-16 can further include wherein the current injection path is a first cable and the return path is a second cable.

In Example 18, the subject matter of Examples 9-17 can further include wherein the first cable is a spiral cable and the second cable is a straight cable.

In Example 19, the subject matter of Examples 9-18 can further include wherein the current injection path is a spiral cable located inside or outside of the target well casing and the return path is the target well casing.

Example 20 is a system comprising: a target well comprising a casing; a power supply coupled to the casing and configured to launch a current downhole through an injection path and receive a return current from a return path, wherein the injection path generates a first magnetic field and the return path generates a second magnetic field that is unbalanced with respect to the first magnetic field; a ranging tool in a ranging well, the ranging tool configured to measure a total field from the first and second unbalanced magnetic fields; and a controller coupled to the ranging tool, the controller configured to determine and decouple the total magnetic field to a relative range and direction from the ranging well to the target well.

In Example 21, the subject matter of Example 20 can further include wherein the injection path or the return path comprises a spiral cable that terminates at the casing.

In Example 22, the subject matter of Examples 20-21 can further include wherein the power supply is grounded via a well head of the target well or a geological formation disposed proximate thereto.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for ranging between a target well and a ranging well, the method comprising:
   generating a first current flowing downhole through a current injection path in the target well, wherein the current injection path is disposed twistedly down the length of the target well and emanates a first magnetic field oriented, at least in part, in the direction along the current injection path;
   generating a second current flowing uphole through a return path in the target well that is connected to the current injection path, wherein the return path emanates a second magnetic field, wherein the first and second magnetic fields are, at least in part, orthogonal and unbalanced with respect to each other; and measuring the first and second magnetic fields from a sensor in the ranging well.

2. The method of claim 1, further comprising measuring a total magnetic fields from the first and second magnetic fields.

3. The method of claim 2, further comprising decoupling the total magnetic field to a relative distance and direction from the ranging well to the target well.

4. The method of claim 1, wherein the current injection path and the return path are exchangeable.

5. The method of claim 1, wherein generating the first current through the current injection path comprises generating the downhole current through a spiral cable.

6. The method of claim 5, wherein the spiral cable is coupled to a casing of the target well such that the casing is the return path.

7. The method of claim 6, wherein the spiral cable is located inside or outside of the casing of the target well.

8. The method of claim 1, wherein generating the first current through the current injection path comprises generating the first current through a magnetically shielded cable.

9. A system for ranging between a target well and a ranging well, the system comprising:

a current injection path having a first current flowing downhole associated with the target well, wherein the current injection path is disposed twistedly down the length of the target well and configured to emanate a first magnetic field oriented, at least in part, in the direction along the current injection path;

a return path in the target well coupled to the current injection path having a second current flowing uphole, wherein the return path is configured to generate a second magnetic field such that the first and second magnetic fields are, at least in part, orthogonal and unbalanced with respect to each other; and the current injection path and current return path are exchangeable.

10. The system of claim 9, wherein the current injection path or the current return path comprises a spiral cable.

11. The system of claim 10, wherein the spiral cable is embedded in concrete around the exterior of a target well casing.

12. The system of claim 10, wherein the current injection path or the current return path comprises a target well casing.

13. The system of claim 10, wherein the spiral cable comprises a high permeability mu-metal cable.

14. The system of claim 13, wherein the spiral cable comprises a mu-metal wire wrapped around a conductive core.

15. The system of claim 13, wherein the spiral cable comprises a conductive wire wrapped around a mu-metal core.

16. The system of claim 13, wherein the spiral cable comprises a core having a shape of one of a triangle, a cylinder, or a rectangle.

17. The system of claim 9, wherein the current injection path is a first cable and the return path is a second cable.

18. The system of claim 17, wherein the first cable is a spiral cable and the second cable is a straight cable.

19. The system of claim 9, wherein the current injection path is a spiral cable located inside or outside of the target well casing and the return path is the target well casing.

20. A system comprising:

a power supply coupled to a casing of a target well and configured to launch a current downhole through an injection path disposed twistedly down the length of the target well and to receive a return current flowing uphole from a return path in the target well coupled to the injection path, wherein the injection path emanates a first magnetic field oriented, at least in part, in the direction along the injection path and the return path emanates a second magnetic field that is, at least in part, orthogonal and unbalanced with respect to the first magnetic field;

a ranging tool in a ranging well, the ranging tool configured to measure a total field from the first and second magnetic fields; and a controller coupled to the ranging tool, the controller configured to determine and decouple a total magnetic field to a relative range and direction from the ranging well to the target well.

21. The system of claim 20, wherein the injection path or the return path comprises a spiral cable that terminates at the casing.

22. The system of claim 20, wherein the power supply is grounded via a well head of the target well or a geological formation disposed proximate thereto.

* * * * *